United States Patent
Engel

(10) Patent No.: US 7,380,861 B2
(45) Date of Patent: Jun. 3, 2008

(54) PLASTIC FUEL INLET COMPARTMENT

(75) Inventor: Ralf Engel, Schneckenlohe (DE)

(73) Assignees: ITW Automotive Products GmbH & Co. KG, Iserlohn (DE), part interest; Dr. Scheider Kunststoffwerke GmbH, Kronach (DE), part interest ( * ) Notice: Subject to any disclaimer, the term of this patent is extended or adjusted under 35 U.S.C. 154(b) by 33 days.

(21) Appl. No.: 10/564,806

(22) PCT Filed: Jul. 16, 2004

(86) PCT No.: PCT/EP2004/007990

§ 371 (c)(1),
(2), (4) Date: Jan. 13, 2006

(87) PCT Pub. No.: WO2005/009771

PCT Pub. Date: Feb. 3, 2005

(65) Prior Publication Data

US 2006/0163902 A1    Jul. 27, 2006

(30) Foreign Application Priority Data

Jul. 18, 2003  (DE) .......................... 203 11 149 U

(51) Int. Cl.
*B60K 15/05* (2006.01)
(52) U.S. Cl. .................................. 296/97.22
(58) Field of Classification Search ............. 296/97.22; 49/400; 220/86.2, 905, DIG. 33; 280/834
See application file for complete search history.

(56) References Cited

U.S. PATENT DOCUMENTS

| 5,076,622 | A | * | 12/1991 | Detweiler | 292/201 |
| 5,165,749 | A | * | 11/1992 | Sheppard | 296/97.22 |
| 5,664,811 | A |   | 9/1997  | Lanyk et al. | |
| 5,906,406 | A | * | 5/1999  | Pajakowski | 296/97.22 |
| 5,924,757 | A | * | 7/1999  | Stapf | 296/97.22 |
| 6,702,357 | B2 | * | 3/2004 | Joerg et al. | 296/97.22 |
| 2005/0280276 | A1 | * | 12/2005 | McComsey | 296/97.22 |
| 2007/0040409 | A1 | * | 2/2007 | Alfaro | 296/97.22 |

FOREIGN PATENT DOCUMENTS

| DE | 32 09 007 C  | 8/1983  |
| DE | 33 01 072 C3 | 7/1984  |
| DE | 100 26 841 A1 | 12/2001 |
| DE | 203 05 291 U1 | 6/2003 |
| EP | 0 736 406 A  | 10/1996 |
| EP | 1 281 558 A  | 2/2003  |

\* cited by examiner

*Primary Examiner*—H Gutman
(74) *Attorney, Agent, or Firm*—Collard & Roe, P.C.

(57) ABSTRACT

The invention relates to a plastic fuel inlet compartment which can be inserted into an opening in the bodywork of a motor vehicle. The invention is characterized by a two-hole embodiment for bivalent tanking whereby the second through hole can also be selectively covered. A controllable closing device can also be easily inserted in a recess in an outer wall of the housing, thereby enabling the fuel inlet compartment valve to be controlled by a motor and to be manually actuated. The fuel inlet compartment can be inserted into an opening of the bodywork in a self-locking manner.

14 Claims, 1 Drawing Sheet

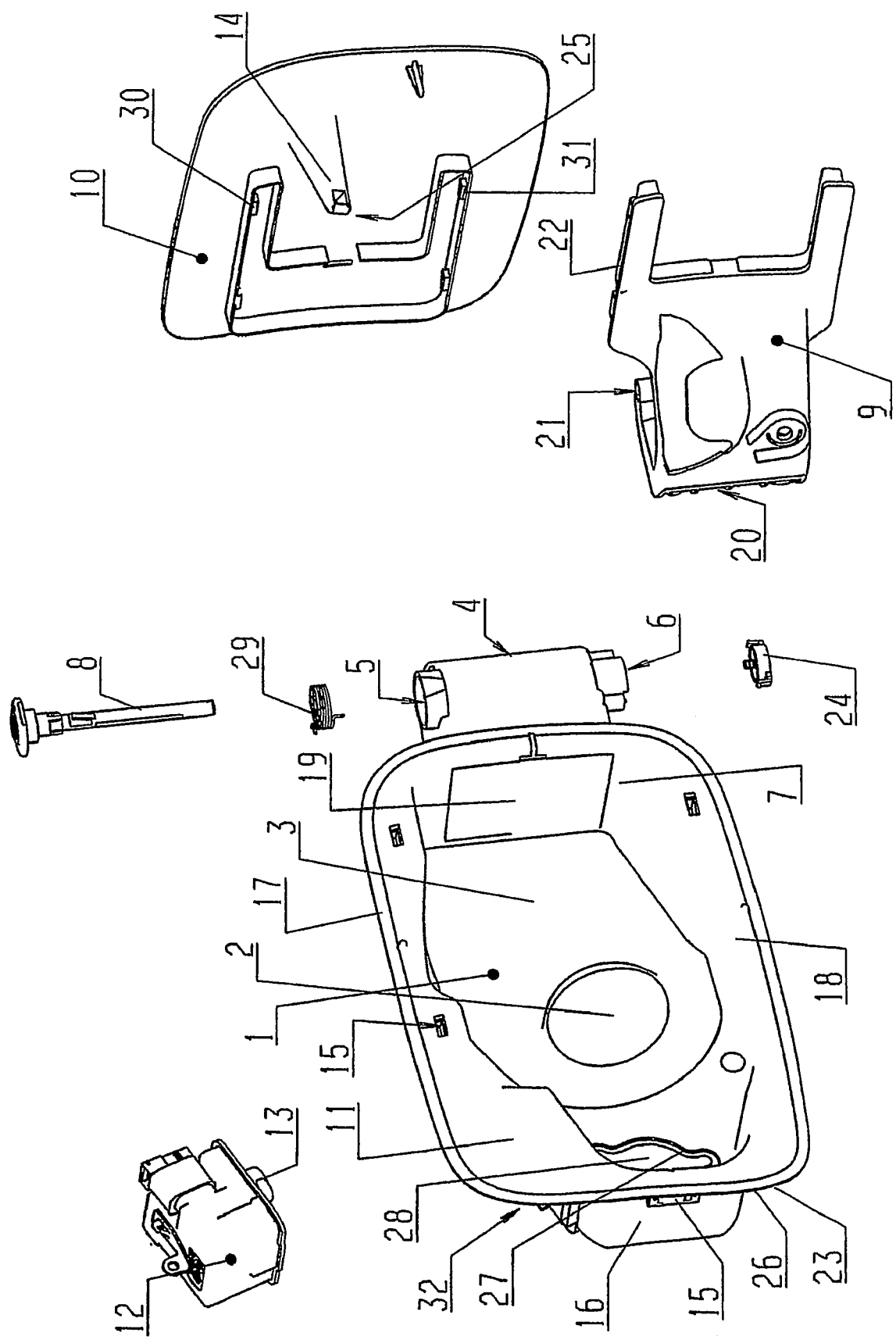

PLASTIC FUEL INLET COMPARTMENT

CROSS REFERENCE TO RELATED APPLICATIONS

Applicant claims priority under 35 U.S.C. § 119 of German Application No. 203 11 149.4 filed Jul. 18, 2003. Applicant also claims priority under 35 U.S.C. § 365 of PCT/EP2004/007990 filed Jul. 16, 2004. The international application under PCT article 21(2) was not published in English.

BACKGROUND OF THE INVENTION

1. Field of the Invention

The invention relates to a plastic fuel inlet compartment for insertion into a car body opening in a motor vehicle.

2. The Prior Art

In motor vehicles, particularly passenger cars, it is known to allow the tank line to end in a fuel inlet compartment and to close off the tank line by means of a rotating closure. On the fuel inlet compartment, there is a pivot bearing for a bearing lever of a door, the pivot radius of which runs in such a manner that in the closed state, the door covers the fuel inlet compartment, for one thing, and for another, it forms a unit with the adjacent car body surface. The door itself is held closed, on the end that lies opposite the bearing end, by means of a locking or lock mechanism. If the locked position is eliminated, for example a cross-bolt is pulled out of a stop projection, the door can be opened.

It is furthermore known to bring the door into a slight set-open opening, by means of a spring, from which it can then be easily opened by hand. Furthermore, it is known as a solution to use a push-push connection, in order to open the door by a gap, in this manner, and then to pivot it into the set-open position, in order to be able to reach the fill pipe of the tank line, after the tank cover has been unscrewed.

In the case of known embodiments, the fuel inlet compartment consists of sheet metal and is welded onto the car body by means of point welding. Furthermore, in the case of known embodiments, the locking devices are attached to the car body, in order to be able to close the tank cover, whereby the bolt projects into the interior of the fuel inlet compartment and engages into the locking opening at the back of the door. It is evident that such a locking device, which is particularly attached under the fender and on it, can become dirty. Furthermore, adjustment work has to be done in order to guarantee problem-free closing and opening of the door, for which purpose a mechanical opener of the bolt must be adjusted, and this is connected with a great amount of time required, because of the difficult accessibility. Furthermore, the door has to be assembled on site.

SUMMARY OF THE INVENTION

The invention is based on the task of constructing a fuel inlet compartment in such a manner that it can be pre-assembled as a complete unit, and that it can be inserted into an opening in a car body wall in simple manner. The parts are furthermore supposed to be non-sensitive to gasoline, diesel oil, or also gas, depending on what fuels are being filled into the tank for the motor.

This task is accomplished by the invention by means of a configuration of the fuel inlet compartment according to the technical teaching indicated in claim 1.

Advantageous further developments of the invention are indicated in detail in the dependent claims.

The fuel inlet compartment is produced from plastic as a support component, and configured in such a manner that it can be inserted into a car body passage provided, e.g. in a fender, in its entirety, in the pre-assembled state. For this purpose, it has a vertically running pivot bearing for a bearing lever of a door. The bearing lever is attached to the pivot bearing by means of bearing pins, before the fuel inlet compartment is inserted into the recess opening in the car body wall. In this connection, the door attached to the bearing lever completely closes the access opening of the fuel inlet compartment. The fuel inlet compartment has a locking device in at least one corner, which is inserted into a shaped bearing chamber. This locking device can be inserted into such a bearing chamber from the inside of the fuel inlet compartment, but also into a bearing chamber formed on the outside. The locking element of the device projects into the fuel inlet compartment. This locking element can be, for example, a rotating hook or a pin that can be pushed, which holds the door fixed in the closed state, for which purpose the locking element works together with a corresponding element on the back of the door. In order to now make simple assembly of the fuel inlet compartment into the car body possible, it is furthermore provided that attachment elements of an appropriate type are provided on the outsides of the mantle walls, to lock the fuel inlet compartment in place, or to attach it with screws, which elements engage behind the car body wall or can be screwed or plugged into it or into other attachment supports.

Depending on the configuration of the bearing lever of the door, the pivot bearing can be disposed in the fuel inlet compartment itself or also in a bearing chamber that is added to and formed on the side of a side wall. The bearing lever has an arc-shaped segment in order to ensure the pivot movement progression that guarantees closing and opening of the door without bumping into the other wall parts. The door that closes off the opening can be configured as a separate component, in such a manner that it can be clipped onto the planar segment of the bearing lever or attached by means of attachment rings or connecting catches. This is advantageous if painted doors are supposed to be used, so that doors having different colored surfaces can be subsequently attached to one and the same bearing lever. The pivot bearing is configured in such a manner that the bearing lever having a vertical bearing bore can be inserted between two bearing bores of the bearing and is locked in place by means of a bearing pin. The bearing pin is configured in such a manner that it engages in the bearing bore of the bearing lever so that it cannot rotate, so that the pin automatically turns along with the pivot movement. This is advantageous if the door is pivoted open by means of a spring when the locking device is in the unlocked position. Such a rotating bearing pin can, of course, also work together with a braking device, in order to guarantee uniform torque while pivoting open. Furthermore, in order to damp the movement, a brake element can be set onto the pin, as an extension of it. This brake element is then mounted so as not to rotate, and causes damped opening. Such a device is indicated in DE 203 05 291 U1 and can be used here.

In the rear wall of the fuel inlet compartment, one or even two passage openings for connecting to tanks can be provided. In the case of the duplicate version, for example for bivalent gas tanking, such connectors are provided. Since such a passage is only required for certain vehicles, the second opening in the rear wall can be marked as a break-out part, by means of a weakening seam in the plastic, which can be broken out in simple manner as needed, e.g. by means of an impact effect. Such an opening can be made in the fuel inlet compartment even in its installed state.

The invention in its combination can be applied to different shapes of the fuel inlet compartment. The fuel inlet compartment can be configured to be essentially rectangular, with squared-off or rounded corners. However, it can also be round or oval in shape. It is clearly evident that the door must have the correspondingly adapted shape, in order to be able to close off the opening of the fuel inlet compartment.

The production advantage in the case of a fuel inlet compartment according to the invention is obvious. All of the elements can already be pre-assembled, and the pre-assembled locking elements can be adjusted and the unit can be easily inserted into the opening provided in the car body. Attachment in the opening itself also takes place by means of catch elements that are injection-molded on. These can be resilient tongues that assure retraction, having catch noses or locking surfaces, or also openings into which such means provided on holders on the car body engage and lock. Since the locking elements, the attachment parts, and the molded parts also consist of plastic, it is furthermore assured that the joints and also the other parts cannot rust.

They are therefore not sensitive to moisture, but also not to fuels that accidentally flow into the fuel inlet compartment.

Furthermore, a switch for manual activation that is accessible from the inside can be provided, to close a circuit that is connected with a control device that records at least the type of fuel being filled into the tank, as a function of the activation of the switch. This switch can also be affixed on the outside and activated by way of a membrane that is inserted into the mantle wall. The invention can be used both for connecting a feed head for gas, hydrogen, or gasoline and diesel, in the combinations used, in each instance.

BRIEF DESCRIPTION OF THE DRAWINGS

The invention will be explained supplementally below, using the example shown in the drawing in the form of an exploded view.

The drawing shows the essential functional units of the fuel inlet compartment in an exploded state.

DETAILED DESCRIPTION OF PREFERRED EMBODIMENTS

The fuel inlet compartment 1 has a rear wall 3, a right mantle wall 7, a left mantle wall 16, and upper and lower mantle walls 17 and 18. A passage hole 2 for accommodating a tank connection part is made in the rear wall 3. The tank line is inserted through this passage opening 2, with its end, which can be closed off by means of a rotating closure, in known manner. A side chamber is formed on the right mantle wall, which acts as a bearing chamber and has bearing bores 5 and 6 at the top and the bottom. The pivot bearing formed by the chamber wall serves to support a bearing lever 9, which has a rear, bent segment 20 and a front, straight segment 22. At the end of the bent segment, there is a bearing bore 21, which runs congruent with the axis of the bearing bores 5 and 6 during assembly. The bearing lever 9 is secured in the pivot bearing 4 by means of a bearing pin 8, which is mounted and guided in the top bearing bore 5 and in the bottom bearing bore 6, while the center part is anchored in fixed manner in the bearing bore, so that the pin 8 turns along with the bearing lever 9 as it pivots. In this connection, the bearing lever 9 is turned by means of a spring 29 that exerts a torque on the bearing pin 8 during opening of the door 10. The door 10 is set onto the planar segment 22 of the bearing lever 9, and attached to it by means of molded detent springs that are attached to the door 10. The door 10 can consist of plastic or of sheet metal. It can also be provided that instead of such attachment springs 30, 31, catch projections are injection-molded on, if the door consists of plastic, which then engage in corresponding catch recesses on the bearing lever 9.

In order for the door 10 not to open suddenly when it is unlocked, a brake element 24 is provided as an extension of the pin 8 and connected with the latter. This brake element has a damping effect on the pin 8, as known from DE 203 05 291 U1, which guarantees a time-delay opening of the door. As a particular feature, a bearing chamber 11 is furthermore provided, specifically, in the case of the exemplary embodiment, made on the outside. Such a bearing chamber, which is formed by shaping, can also be provided on the inside. An opening 32 is provided in the upper wall of the bearing chamber 11, through which a locking element 13 of a locking device can be inserted, which device is affixed in a housing 12. This can be, for example, a so-called micro-actuator, which has a locking element driven by an electric motor, which ensures emergency opening and/or push-push activation by means of the shaping of the hook. Furthermore, the tank door 10 can also be pivoted into a slit-shaped opening position by means of the shaping of the hook, before the spring 29 brings about complete opening. Such a micro-actuator is known for this purpose. It needs little space and can be used even in the winter, since the locking element and the other elements essentially consist of plastic.

The fuel inlet compartment furthermore has a wall part in the rear wall that can be broken out, by means of a weakening groove 27, for bivalent gas tanking. This wall part can be broken out if needed, so that a second opening is available in order to be able to connect a tank connector for gas tanking, for example, in this way.

The micro-actuator can have a hook-shaped locking element 13 configured in this manner and be coupled with a switch element, in such a manner that it can also be used as a manually activated rotary latch. If the micro-actuator is caused, by means of remote unlocking, to bring the locking element 13 into a first rotary position, in which the hook releases the locking pin, it can be provided that an electric switch having a short stroke is activated by pressing on the tank door, by way of the given rotary latch. The switching signal is evaluated by the control device, and the micro-actuator is caused to turn the locking element electrically, by a certain angle, as a function of this assessment. In this connection, the locking pin slides along a flank of the hook and the door 10 is pressed open by a gap, in the manner of an ejector. The tank door 10 can then be pivoted open completely by means of the spring 29 in the tank door hinge. If the spring 29 is designed accordingly, the tank door can also be held in this position until opening of the door is activated by hand. If the setter of the locking element is shut off, it can return to the "locked" position by way of an integrated spring in the micro-actuator. During locking, the tank door 10 is pressed shut, causing the rotary latch of the locking pin 13 to engage behind the tank door 10 and thereby to lock the tank door 10 in place. Once the opening mechanism is locked, the soft-touch function described above is deactivated; the door closure cannot be opened.

The plastic fuel inlet compartment for insertion into a car body opening in a motor vehicle, has a stop projection 14 on the back of the bearing lever 9 or the door 10 in the closed position.

There are devices 15 on the outsides of the mantle walls (7, 16, 17, 18) for engaging the fuel inlet compartment 1 and/or attachment projections for attaching the fuel inlet compartment 1 on the car body and/or on the supports attached to it.

The fuel inlet compartment has a pivot bearing 4 which is disposed in a side chamber 19 provided in a side wall 7, projecting laterally, and that the bearing lever 9 has an arc-shaped segment 20 having a vertical bearing bore 21 for the bearing pin 8 and a planar segment 22, and the door 10 rests against the opening edge 23 of the fuel inlet compartment 1.

The fuel inlet compartment has a stop projection 14 having a perpendicular locking segment 25 which is provided on the door 10 or on the bearing lever 9, opposite the pivot bearing 4, which projection engages in a contour-adapted recess 26 in a projection provided on the inside, on the mantle wall 16 of the fuel inlet compartment that lies opposite the pivot bearing 4, and that the locking element 13 engages behind the locking segment 25.

The invention claimed is:

1. Plastic fuel inlet compartment having:
   a passage hole (2) in a rear wall (3) for connecting or passing through a tank line that can be closed,
   a second passage opening (28) in the rear wall (3), delimited by a weakening groove (27), for bivalent gas tanking, marked or molded on, and that after installation or during pre-assembly of the fuel inlet compartment, a wall part delimited in this manner can be broken out or pushed out to form the passage opening (28),
   a pivot bearing (4) that runs essentially vertically, with horizontal bearing bores (5, 6) at a top and bottom on at least one mantle wall (7) of the fuel inlet compartment (1), for insertion of a bearing pin (8) that is mounted to rotate therein, to which a bearing lever (9) of a door (10) that closes off the fuel inlet compartment (1) is attached,
   at least one bearing chamber (11) for accommodating at least one locking element (13) disposed in a housing (12), for locking the door (10) when closed, the fuel inlet compartment (1), said locking element (13) can rotate or be displaced, which releasably engages behind a stop projection (14) on the door (10) when closed,
   devices (15) on the outsides of said at least one mantle wall(7, 16, 17, 18) for engaging the fuel inlet compartment (1) for attaching the fuel inlet compartment (1).

2. Fuel inlet compartment according to claim 1, wherein the pivot bearing (4) is disposed in a side chamber (19) provided in said at least one mantle wall (7), projecting laterally, and that the bearing lever (9) has an arc-shaped segment (20) having a vertical bearing bore (21) for the bearing pin (8) and a planar segment (22), and the door (10) rests against an opening edge (23) of the fuel inlet compartment (1) with an outer edge region, and assumes an at least approximately perpendicular position to the fuel inlet compartment opening when opened.

3. Fuel inlet compartment according to claim 2, wherein the door (10) is releasably attached to the planar segment (22) of the bearing lever (9), particularly by means of rear-side catch elements thereon.

4. Fuel inlet compartment according to claim 2, wherein a mechanical or viscous brake (24) that is mounted to rotate in the side chamber, applying a certain torque, is coupled with the rotating bearing pin (8), at least at one end, the housing of the brake is attached so as not to rotate out of position, on a bearing wall of the pivot bearing (4) or a wall of the side chamber (19).

5. Fuel inlet compartment according to claim 1, wherein a stop projection (14) having a perpendicular locking segment (25) is provided on the door (10) opposite the pivot bearing (4), said stop projection engages in a projection (15) provided on the inside, on said at least one mantle wall (16) of the fuel inlet compartment that lies opposite the pivot bearing (4), and that the locking element (13) engages behind the locking segment (25).

6. Fuel inlet compartment according to claim 1, wherein the second passage opening (28) is already provided as an open passage hole.

7. Fuel inlet compartment according to claim 1, wherein the face of the fuel inlet compartment (1) is provided with a circumferential frame-shaped edge (23) that projects beyond said at least one mantle wall on the outside.

8. Fuel inlet compartment according to claim 7, wherein the outsides of said at least one mantle wall(7, 16, 17, 18) work together with the rear side of the edge (23) in such a manner that the fuel inlet compartment is held locked in place when inserted.

9. Fuel inlet compartment according to claim 1, wherein the fuel inlet compartment (1) forms an assembly unit with the locking element (13) in said housing (12), the bearing lever (9), the door (10), and the bearing pin (8).

10. Fuel inlet compartment according to claim 1, wherein the bearing chamber (11) for the locking element (13) having the housing (12), stops the housing (12) of the locking element (13).

11. Fuel inlet compartment according to claim 1, wherein the door (10) and the bearing lever (9) and the locking element also consist of plastic.

12. Fuel inlet compartment according to claim 1 wherein the locking element (13) having the housing (12) is a microactuator that can be electrically controlled, about a defined angle, that accommodates the door (10), when locked, and pivots the door open by means of excitation with current.

13. Fuel inlet compartment according to claim 12, wherein the locking element is hook-shaped, a locking pin or projection (14) on the rear of the door (10) slides along the locking element which moves in a rotational manner to a certain angle, which opens the door (10) by a defined gap, and the locking element can be reset and locked.

14. Fuel inlet compartment according to claim 12, wherein the fuel inlet compartment has for manual activation, accessible on the inside, for closing which records at least the type of fuel being filled, as a function of the activation.

* * * * *

UNITED STATES PATENT AND TRADEMARK OFFICE
CERTIFICATE OF CORRECTION

PATENT NO. : 7,380,861 B2
APPLICATION NO. : 10/564806
DATED : June 3, 2008
INVENTOR(S) : Engel Page 1 of 1

It is certified that error appears in the above-identified patent and that said Letters Patent is hereby corrected as shown below:

On the Title Page, item [73], please change "Dr. Scheider Kunststoffwerke GmbH" to correctly read:

--Dr. Schneider Kunststoffwerke GmbH--.

Signed and Sealed this

Twelfth Day of August, 2008

JON W. DUDAS
*Director of the United States Patent and Trademark Office*